Sept. 18, 1934.     A. D. MACLACHLAN     1,974,285
HOSE AND METHOD OF MAKING THE SAME
Filed March 6, 1933
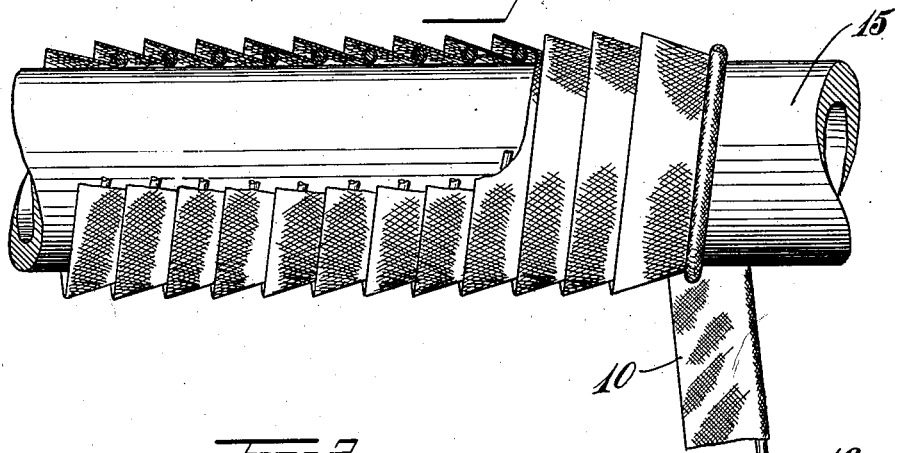
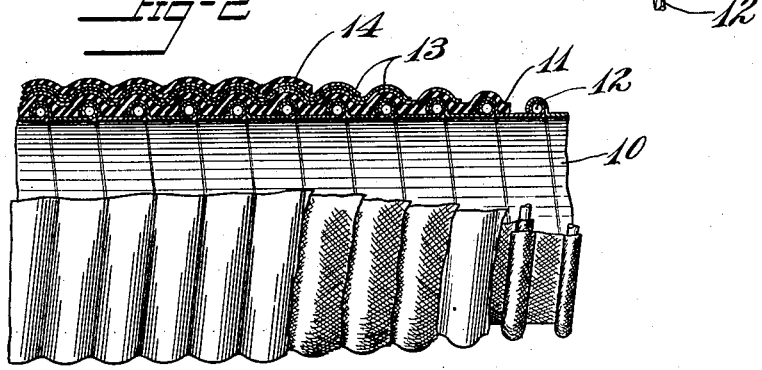
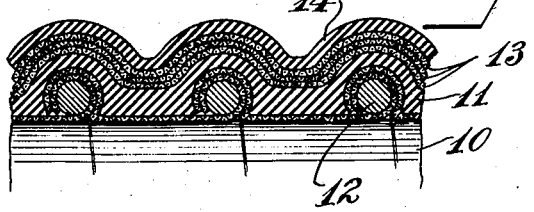
Inventor
Andrew D. MacLachlan
By Eakin & Avery
Attys Patented Sept. 18, 1934

1,974,285

UNITED STATES PATENT OFFICE 1,974,285

HOSE AND METHOD OF MAKING THE SAME

Andrew D. Maclachlan, Akron, Ohio, assignor to The B. F. Goodrich Company, New York, N. Y., a corporation of New York Application March 6, 1933, Serial No. 659,685

12 Claims. (Cl. 154—8)

This invention relates to hose, especially hose that is used for conducting fluids, such as petroleum fluids, which cause swelling of rubber, and the invention relates also to procedure for making such hose.

Because of the swelling which rubber undergoes in contact with fluids such as hydrocarbon fluids, resulting in the breaking up and deterioration of the swollen rubber by the abrasive action of the flowing fluid, it is not feasible to use a lining of unprotected rubber in hose for conducting such fluids. In prior construction a lining of fabric has usually been provided in the bore of the hose carcass to resist abrasion of the rubber by the fluid and to prevent particles of the rubber from becoming entrained in the fluid. Such fabric lining, however, has been subject to separation from the hose carcass, itself then clogging the hose, and exposing the rubber, especially where the hose has been used for suction purposes and where the adhesion of the fabric to the rubber carcass has been lessened or destroyed by the action of rubber-swelling fluids. In order to hold the fabric lining in place it has been customary to provide an inner flexible metallic lining, usually of metallic strip material in spaced helical convolutions, about which the fabric lining and hose carcass has been built. While the metallic lining resists separation of the fabric, it does not give the hose a smooth bore, and sand or other foreign particles carried by the fluid are easily pocketed by the metallic convolutions, resistance to flow is undesirably increased, and the irregular bore of the hose promotes wear by abrasion, especially where the fluid is laden with particles of an abrasive nature.

The chief objects of this invention are to provide an improved hose having a smooth bore and in which there is provision for effectively protecting the rubber of the hose carcass from deterioration under the action of rubber-swelling fluids, and to provide improved procedure for making such hose.

More detailed objects are to provide an improved anchorage for a fabric lining in a rubber hose, and to provide for holding the margins of such fabric lining entirely concealed in the hose wall.

These and further objects will be apparent from the following description, reference being had to the accompanying drawing in which:

Fig. 1 is an elevation, with parts broken away and in section, of a building mandrel and a partially built hose thereon, the latter being constructed in accordance with the invention in its preferred form.

Fig. 2 is an elevation, with parts broken away and in section, of the completed hose.

Fig. 3 is an enlarged longitudinal section of the hose, with parts broken away.

Referring to the drawing, the hose constructed according to the invention comprises in its bore a lining of strip fabric 10 disposed helically with the margins of adjoining convolutions of the fabric associated in overlapped relation and embedded in a rubber body 11 of the hose wall. A hose reinforcement 12 of metallic strip material disposed in spaced apart helical convolutions is positioned radially outward of the fabric lining with the overlapped margins of the latter folded about the metal strip to increase the security of the fabric anchorage. The remainder of the hose wall may comprise one or more reinforcing plies 13, 13 of fabric or other suitable material and if desired, a rubber cover 14 over the fabric reinforcement.

The fabric lining with its inturned margins anchored in the hose wall presents a substantially smooth bore, thereby minimizing the resistance to flow and the undesirable collection of particles carried by the fluid, as well as the wear caused by the passage of abrasive particles over a rough bore surface. At the same time the fabric prevents particles of rubber from being loosened from the carcass and entrained in the fluid when the rubber is swollen and made temporarily vulnerable to deterioration by the action of a rubber-swelling fluid. The fabric lining itself, being effectively anchored at its margins, is restrained from being loosened or disturbed from its proper disposition under the forces of suction in the bore or flow of the fluid. This security of anchorage is especially desirable when the adhesion of the fabric with the rubber between the anchorages is temporarily lessened by the action of rubber-swelling fluids.

In the preferred procedure of constructing the hose the strip fabric of the lining 10, preferably frictioned or otherwise rubberized, is folded at one of its margins about a strip of the metallic reinforcement 12 and adhered thereto, and this assembly, with the reinforced margin of the fabric leading, is applied helically in overlapped relation upon a building mandrel 15, the rear margin of each convolution then lying upon the reinforced margin of the next previously applied convolution as a rearwardly projecting flap in the manner illustrated in Fig. 1. The fabric is then pressed or rolled flat against the mandrel between the reinforcing convolutions and is tucked in closely at the base of each of the reinforcing convolutions as shown in Figs. 2 and 3 to provide a substantially uninterrupted bore surface. The remainder of the fabric flap is then folded about its underlying reinforced fabric margin and pressed or rolled down into adhesion therewith.

The rubber 11, the reinforcing plies 13, 13 and the rubber cover 14 are then successively applied to the structure, and the whole then subjected to a suitable vulcanizing operation, as by applying to the structure a temporary fabric wrapping and curing it in an atmosphere of steam.

The procedure is rapid and provides for conveniently and neatly anchoring the margins of the strip fabric of the lining in the body of the hose wall, and a hose of the desired strength and flexibility is provided with economy of materials.

I claim:

1. A hose having a flexible lining sheet, said sheet having an anchoring portion thereof in contact with another portion of itself and embedded in the material of the hose body.

2. A hose comprising rubber in its body and having a flexible lining sheet, said lining sheet having an anchoring portion folded upon and in contact with another portion of itself and embedded in the rubber of the hose body.

3. A hose comprising a body having a lining of flexible strip material disposed in helical convolutions, the adjacent margins of said convolutions being folded in overlapped relation and anchored in the hose body.

4. A hose as defined in claim 3 comprising a metallic strip reinforcement disposed in helical convolutions radially outward of the said lining convolutions with the overlapped margins of the latter folded about the metallic strip convolutions.

5. A hose comprising rubber in its body and having a lining of flexible strip material disposed in helical convolutions, the adjacent margins of said convolutions being folded in overlapped relation and embedded in the rubber of the hose body.

6. A hose comprising a lining of strip fabric disposed in helical convolutions with the adjacent margins thereof folded in overlapping relation, a metallic strip disposed in helical convolutions radially outward of said fabric convolutions with the overlapped margins of the latter folded about the metallic convolutions, and a layer of rubber upon said fabric and metallic strip assembly.

7. A hose as defined in claim 6 comprising a second reinforcement associated with the said layer of rubber of the hose wall.

8. The method of making a hose which comprises arranging a flexible sheet of hose lining material in tubular form with a margin of the sheet extending outwardly, and assembling therewith a hose carcass with the said margin of the sheet anchored in the hose carcass, a face of the sheet being disposed as the bore surface of the hose.

9. The method of making a hose which comprises arranging a flexible sheet of hose lining material upon a building core with a margin of the sheet raised from the core surface, and assembling therewith a hose carcass including a layer of rubber next to the lining in association with the said raised margin of the sheet, a face of the sheet being disposed as the bore surface of the hose.

10. The method of making a hose which comprises arranging flexible strip lining material in helical convolutions upon a building core with the adjacent margins of the convolutions overlapped and raised from the core surface, and assembling therewith a hose carcass including a layer of rubber next to the lining in association with the raised margins of the lining convolutions.

11. The method of making a hose which comprises assembling upon a building core flexible strip lining material and a narrower reinforcing strip element both in helical convolutions about the core with a margin of the lining strip folded about the said reinforcing strip and with the unreinforced margin of each convolution of the lining strip overlying the reinforced margin of the next previously applied convolution, and building thereupon the remainder of the hose carcass.

12. The method of making a hose which comprises assembling upon a building core flexible strip lining material and a narrower reinforcing strip element both in helical convolutions about the core with a margin of the lining strip folded about the said reinforcing strip and with the unreinforced margin of each convolution of the lining strip overlying the reinforced margin of the next previously applied convolution, pressing the lining strip into close association with the building core and reinforcing strip, assembling therewith the remainder of the hose carcass including a layer of rubber next to the lining, and vulcanizing the structure.

ANDREW D. MACLACHLAN.